United States Patent
Kobayashi

[19]

[11] Patent Number: 5,951,430
[45] Date of Patent: Sep. 14, 1999

[54] VEHICULAR DIFFERENTIAL LIMITING MECHANISM

[75] Inventor: Toshio Kobayashi, Tokyo, Japan

[73] Assignee: Fuji Jukogyo Kabushiki Kaisha, Tokyo, Japan

[21] Appl. No.: 08/898,519

[22] Filed: Jul. 22, 1997

[30] Foreign Application Priority Data

Jul. 30, 1996  [JP]  Japan .................................. 8-200742

[51] Int. Cl.⁶ .................................................. F16H 48/08
[52] U.S. Cl. ........................ 475/221; 475/248; 475/339; 180/248
[58] Field of Search ................................. 475/248, 249, 475/332, 339, 250, 253, 221; 180/248

[56] References Cited

U.S. PATENT DOCUMENTS

| 2,231,784 | 2/1941 | Thüngen | 475/339 X |
| 4,907,672 | 3/1990 | Muzzarelli | 475/221 X |
| 5,167,293 | 12/1992 | Park et al. | 475/221 X |
| 5,205,797 | 4/1993 | Kobayashi et al. | 475/221 |

FOREIGN PATENT DOCUMENTS

| 4271926 | 9/1992 | Japan . |
| 5280597 | 10/1993 | Japan . |

Primary Examiner—Charles A. Marmor
Assistant Examiner—Sherry Lynn Estremsky
Attorney, Agent, or Firm—Martin A. Farber

[57] ABSTRACT

A compound type planetary gear set lacking ring gears has been applied to a differential limiting apparatus for distributing driving force between left and right wheels of a vehicle. The driving force conveyed from an engine is inputted to a first sun gear through a differential case and dividedly transmitted to a second sun gear through first and second pinions composed of helical gears and to a carrier supporting the first and second pinions, respectively. The driving force conveyed to the second sun gear is transmitted to a left drive axle and the driving force conveyed to the carrier is transmitted to a right drive axle. When slipping occurs in the left or right wheels, the first and second pinions rotate around the first and second sun gears. The helix angles of the first and second pinions produce thrust forces which generate a differential limiting torque between the left and right drive axles.

15 Claims, 11 Drawing Sheets

VEHICULAR DIFFERENTIAL LIMITING MECHANISM

BACKGROUND OF THE INVENTION

1. Field of the Invention

The present invention relates to a vehicular differential limiting mechanism and particularly to a differential limiting mechanism using a compound type planetary gear unit for generating a differential limiting torque which is proportional to an input torque.

2. Prior Arts

When a two wheel drive vehicle incorporating a conventional differential travels in such a state that one of left and right drive wheels is on a road surface with a low friction coefficient and the other is on a road surface with a normal friction coefficient, the vehicle may exhibit an unstable behavior because the wheel on the road surface with a low friction coefficient slips and the other wheel on the road surface with a normal friction coefficient loses traction, too. There occurs a similar phenomenon when the vehicle travels on bumpy roads or traverses steep grades. When the vehicle travels on bumpy roads, the vehicle may experience frequently such a state that one of the left and right drive wheels is detached from a road surface and a drive wheel on the opposite side loses traction. Further, when the vehicle traverses a steep grade, a drive wheel in the high position reduces traction and resultantly a drive wheel in the low position also reduces traction.

In general, differential limiting apparatuses capable of generating a differential limiting torque proportional to input torque are of much benefit to improve these phenomena and to enhance vehicle maneuverability under adverse road conditions. Miscellaneous types of differential limiting apparatuses have been developed to date and some of them have been put into practical use.

Japanese patent application laid-open No. Toku-Kai-Hei 5-280597 discloses a differential limiting apparatus which comprises a first side gear connected to one output shaft, a second side gear connected to the other output shaft, a first pinion having a first gearing section at one end thereof which meshes with the first sun gear and having a second gearing section at the other end thereof, a second pinion having a third gearing section at one end thereof which meshes with the first gearing section and having a fourth gearing section at the other end thereof which meshes with the second gearing section and at the same time with the second side gear, and a housing having a plurality of holes for accommodating and rotatably supporting a pair of the first and second pinions therein, so as to produce a differential limiting torque by friction forces generated in the meshing portions of gears and the sliding portions between the pinions and the housing or between the pinions and the holes.

Further, as another example of disclosures, there is a differential limiting apparatus proposed in Japanese patent application laid-open No. Toku-Kai-Hei 4-271926. The differential according to this disclosure includes a pair of side gears (worm gears) whose respective end is connected with drive axle ends respectively, a plurality of pairs of element gears (worm wheels) meshing with side gears and at the same time meshing with each other at respective gearing sections provided at both ends thereof, a housing for accommodating and supporting the element gears, and bearing members such as thrust washers provided between the ends of the element gears and the housing, so as to generate a differential limiting torque proportional to an input torque.

However, the differential limiting apparatus according to the former prior art has several problems coming from using a lot of gears constituting that apparatus. That is, a first problem is a deviation of the differential limiting torque which is caused by many places where friction originates.

Secondly, there is a problem of backlash in gears. So many gears produce an increase of accumulated backlashes which leads to play in the power transmission system such as a play between left and rear wheels or between a propeller shaft and the left or right wheel, resulting in an adverse effect on vibrations or noises. Especially when a driver repeats depressing and releasing the accelerator pedal or when he suddenly depresses the accelerator pedal from the release condition, strange noises or vibrations tend to occur in the power transmission system of the vehicle. Reducing backlashes of gears is not acceptable from the view point of an increase in manufacturing cost due to high precision machining processes on the housing and gearing components.

Further, another problem is a small degree of freedom in setting gear specifications due to the condition of the number of teeth for arranging a plurality of pinions at an even angular increment. Also, a further problem is a limitation in numbers of teeth of pinions due to a necessity for arranging a plurality of pinions at an even angular increment. Small numbers of teeth incur weak strength of gears.

On the other hand, in case of the differential limiting apparatus using the combination of worm gears and worm wheels, as described in the latter case of the prior art, a separate lubricating system is needed to be incorporated because lubrication oil to lubricate these worm gear and worm wheels must be a hypoid gear oil containing extreme-pressure additives. The separate lubricating system is disadvantageous in employing an automatic transmission oil (ATF) for both the automatic transmission and the differential, particularly in case where the automatic transmission and the differential are accommodated in a common housing.

The case is similar to the differential using a combination of side gears and pinions as described in the former case of the prior art.

SUMMARY OF THE INVENTION

It is therefore an object of the present invention to provide a differential limiting apparatus having a simple construction, a small number of components and a compact body. Further, it is another object of the present invention to provide a torque responsive type differential limiting apparatus having less play in the power transmission system and an excellent maneuverability on a slippery road or the like with a proper operation of the accelerator pedal.

DETAILED DESCRIPTION OF THE INVENTION

FIGS. 1 through 11 show a first embodiment in which an example of the differential limiting apparatus has been applied to a front-wheel and front-engine (FF) vehicle.

Figure 1:
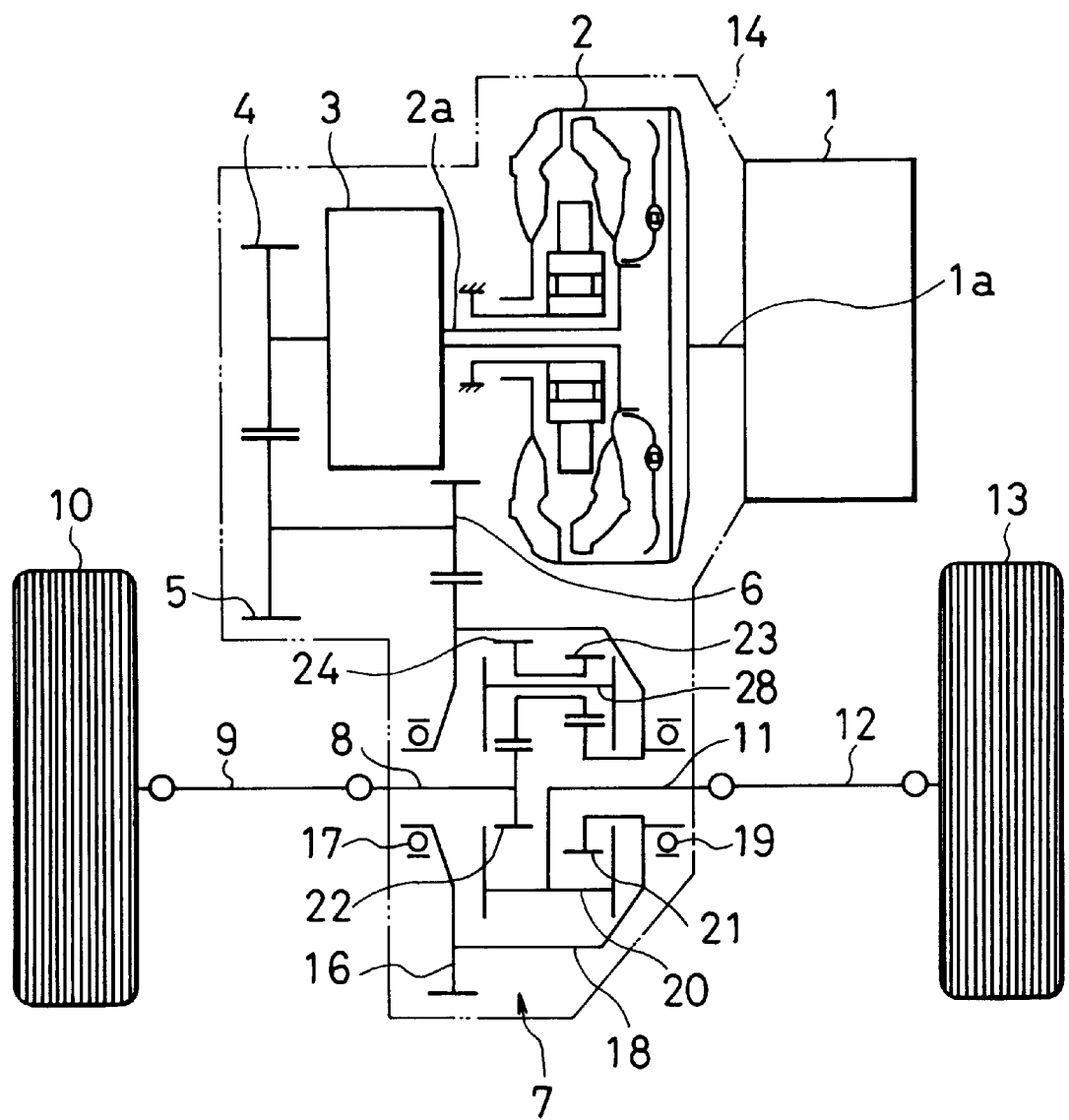
FIG. 1 is a schematic drawing showing an example of a differential limiting apparatus applied to a front engine front drive (FF) vehicle according to a first embodiment of the present invention.

Referring now to FIG. 1, numeral 1 denotes an engine mounted at the front side of a vehicle. A crank shaft 1a of the engine 1 is coupled with a torque converter 2 from which an input shaft 2a extends to an automatic transmission 3.

Further, a driving force of the automatic transmission 3 is transmitted and inputted to a differential limiting apparatus 7 also acting as a final speed reduction apparatus through a primary reduction drive gear 4, a primary reduction driven gear 5 meshing with the drive gear 4 and a final drive gear 6 connected with the driven gear 5.

A driving force is transmitted from the differential limiting apparatus 7 to a left wheel 10 through a left drive shaft 8 and a left axle shaft 9 and to a right wheel 13 through a right drive shaft 11 and a right axle shaft 12, respectively.

These components, torque converter 2, automatic transmission 3, gears 4, 5 and 6, and differential limiting apparatus 7 are integrally accommodated in one transmission case 14 and are lubricated with ATF.

Figure 2:
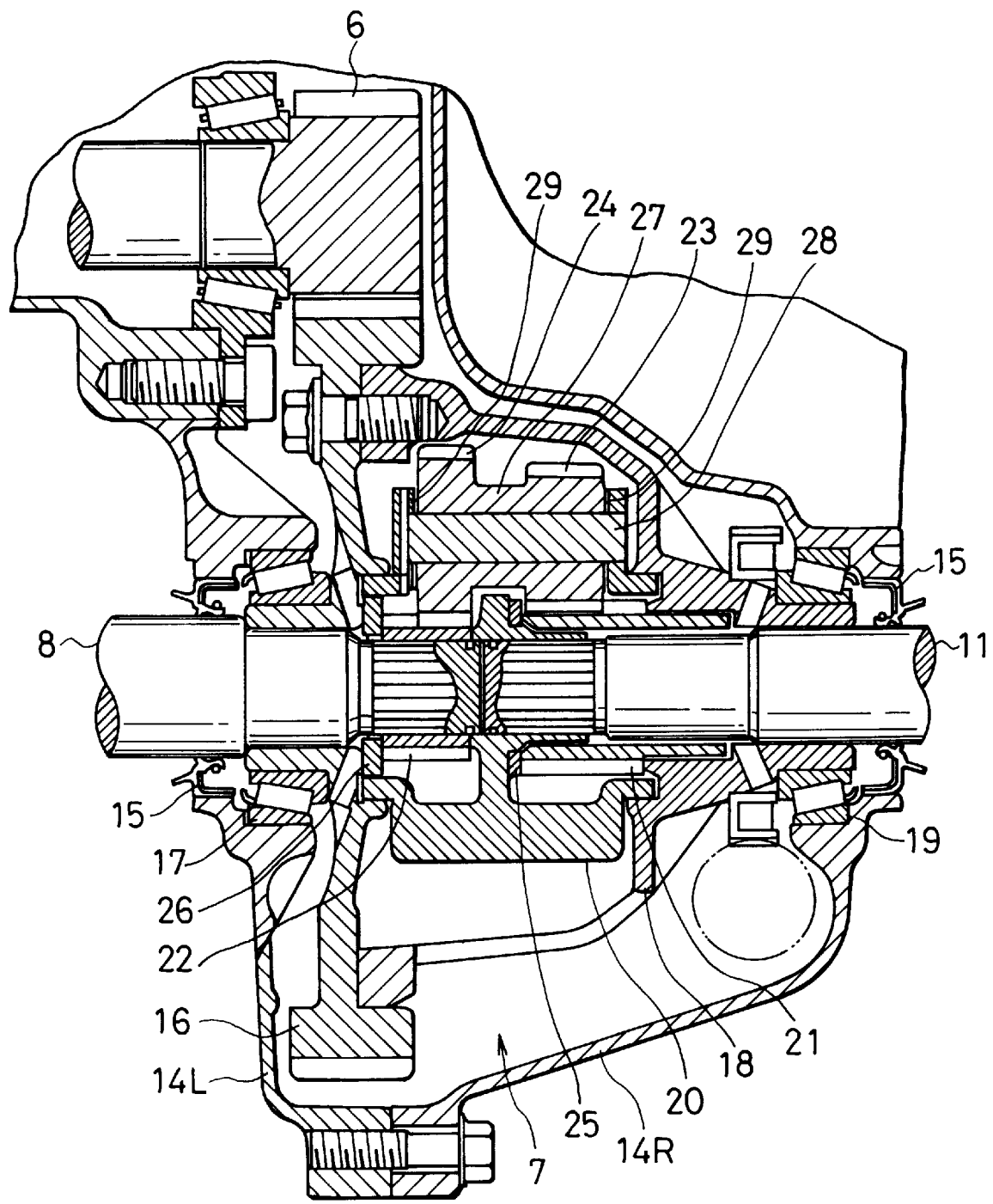
FIG. 2 is an enlarged fragmentary sectional drawing showing a differential limiting apparatus according to a first embodiment of the present invention.
Figure 3:
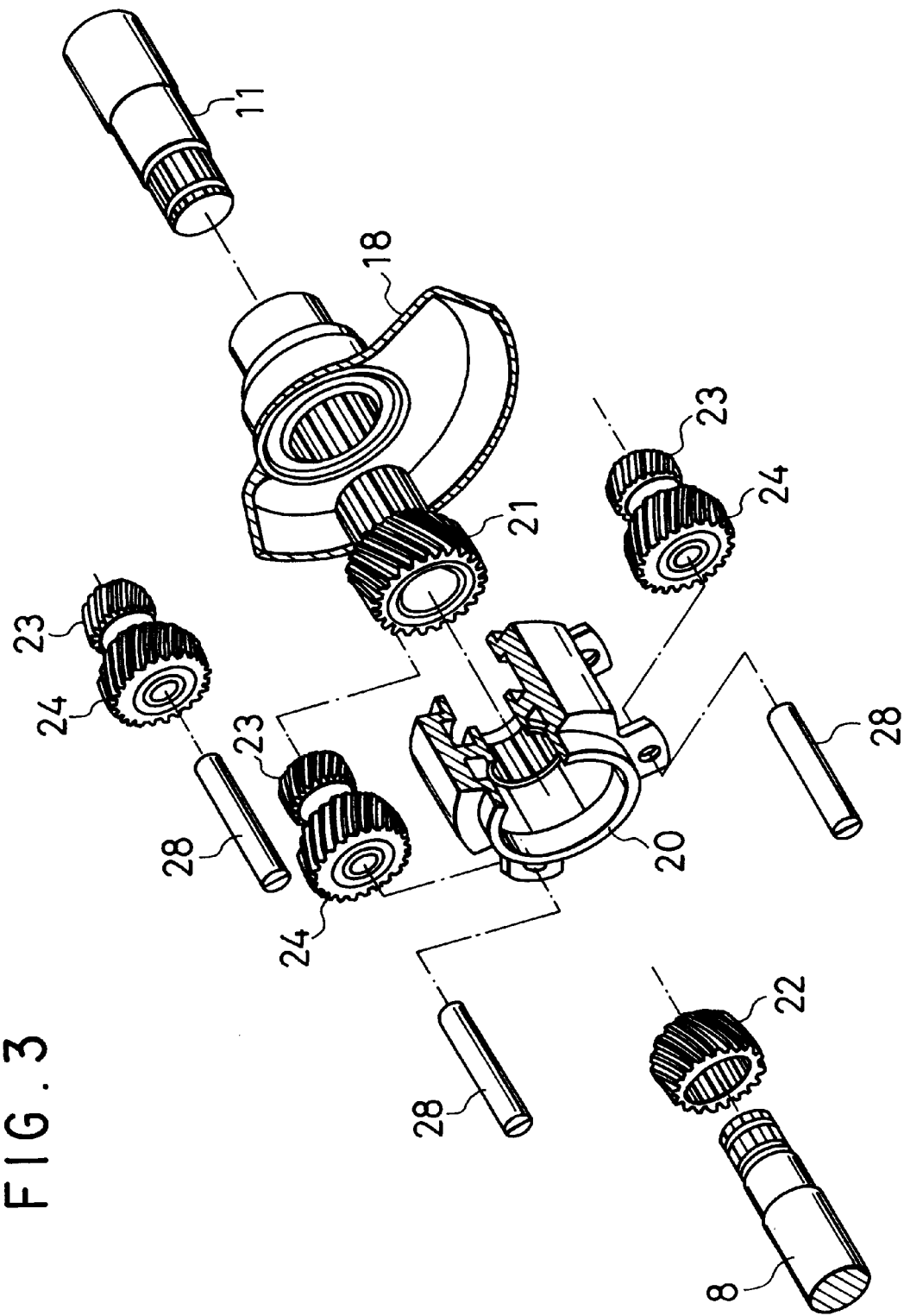
FIG. 3 is a perspective view showing an arrangement of constituting components of a differential limiting apparatus according to a first embodiment of the present invention.

Describing the differential limiting apparatus 7 with reference to FIGS. 2 and 3, the left drive shaft 8 is rotatably suspended through a left transmission case 14L and the right drive shaft 11 is rotatably suspended through a right transmission case 14R on the same axis of rotation as the right drive shaft 11. Further, the left and right drive shafts are sealed against the left and right transmission cases 14L and 14R by oil seals 15, 15, respectively.

A final driven gear 16 meshing with the final drive gear 6 is rotatably coupled about the periphery of the left drive shaft 8 and the left drive shaft 8 and the final driven gear 16 are supported by the left transmission case 14L through a bearing 17.

A differential case 18 is fixed at one end thereof to the final driven gear 16 on the same axis of rotation as the final driven gear 16 and the other end of the differential case 18 is rotatably coupled about the periphery of the right drive shaft 11. Further, the right drive shaft 11 and the differential case 18 are rotatably supported by the right transmission case 14R through a bearing 19.

Within the differential case 18, a carrier 20 is rotatably provided on the common axis of rotation and the left and right drive axles 8 and 11 are inserted in the carrier 20, respectively. The carrier 20 is connected with the end portion of the right drive shaft 11 through splines.

Further, a first sun gear 21 having a large diameter is connected with the differential case 18 through splines and a second sun gear 22 having a small diameter is connected with the end portion of the left drive shaft 8. The first sun gear 21 meshes with a first pinion 23 having a small diameter, forming a first gear train. Further, the second sun gear 22 meshes with a second pinion 24 having a large diameter, forming a second gear train. Further, washers 25 and 26 are inserted between an end face of the first sun gear 21 and the carrier 20 and between an end face of the second sun gear 22 and the final driven gear 16, respectively.

The first pinion 23 and the second pinion 24 are integrally formed on a pinion member 27 and a plurality of the pinion members 27 (preferably, at least 3 pieces of the pinion members) are rotatably supported by respective planetary pins 28 which are fixed to the carrier 20. Further, a washer 29 is inserted at both ends of the pinion member 27 respectively for supporting thrust loads acting between the pinion member 27 and the carrier 20.

The driving force conveyed from the final drive gear 6 is transmitted to the first sun gear 21 through the final driven gear 16 and the differential case 18. The driving force transmitted to the first sun gear 21 is conveyed to the left drive shaft 8 through the pinion member 27 and the second sun gear 22 and at the same time to the right drive shaft 11 through the carrier 20.

The thus constituted compound planetary type differential limiting apparatus 7 can have a differential function by properly selecting numbers of teeth of the first and second sun gears 21, 22 and the first and second pinions 23, 24 which are arranged around those sun gears 21, 22.

Further, this differential limiting apparatus can also be designed so that the standard torque distribution between the left and right wheels becomes even (50:50) by properly establishing pitch circle radii of the first and second sun gears 21, 22 and the first and second pinions 23, 24.

Incidentally, torque transmitted to gears with inclined teeth generates a thrust force against gear mounting surfaces. In this differential limiting apparatus, both first and second gear trains have teeth with helix angles and further a respective helix angle is different from each other. As a result, some amount of thrust forces are offset and some are reserved. This reserved (remaining) thrust forces generate a friction torque at one end of the pinion member 27. On the other hand, the gear meshes produce separating forces and tangential forces in both pinions 23, 24 and the planetary pin 28 and the resultant force generates another friction torque. These friction torques act as a differential limiting torque, a differential limiting function being provided in the differential limiting apparatus 7.

Figure 4:
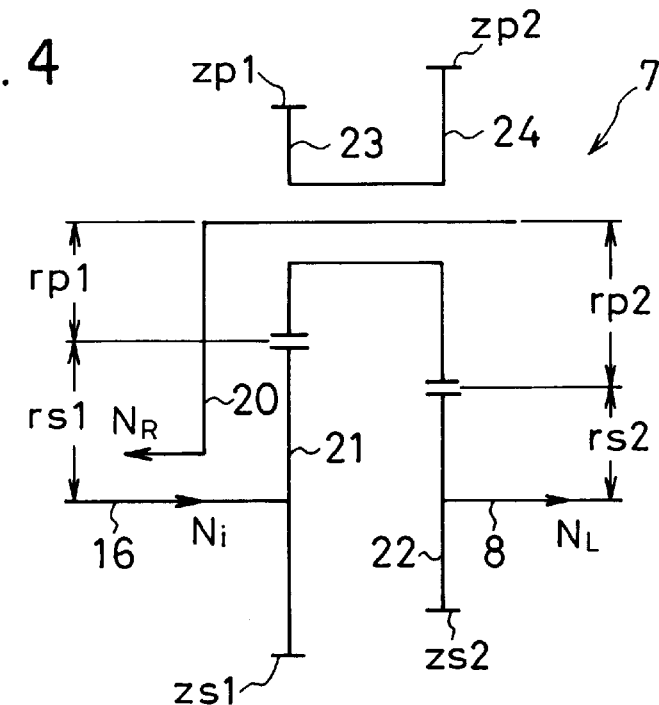
FIG. 4 is a view for explaining a differentiation of a differential limiting apparatus according to a first embodiment of the present invention.

Next, the differential function will be described with reference to FIGS. 4, 5 and 6.

Figure 5:
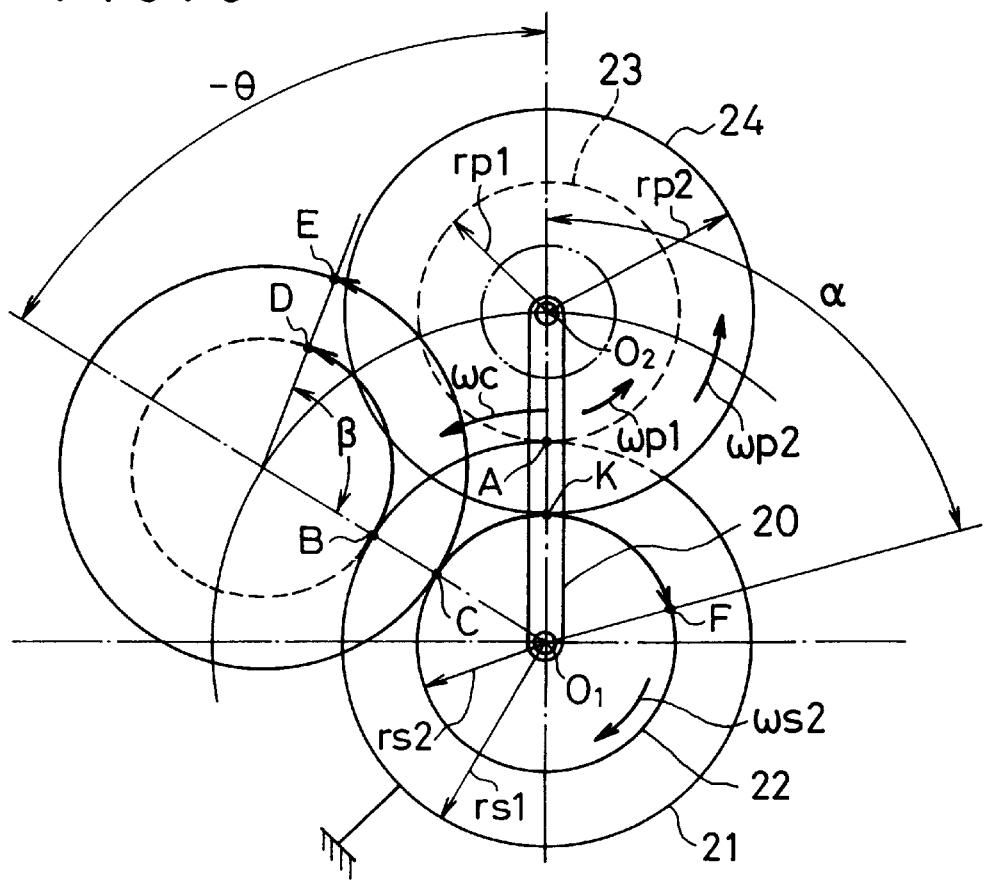
FIG. 5 is a view for explaining an operation of a differential limiting apparatus according to a first embodiment of the present invention when a first sun gear is fixed.

Referring to FIG. 5, when the first sun gear 21 is fixed, the following equation is obtained on the circle with a radius $r_{s2}$:

$$(\text{Arc } KF) = (\text{Arc } CF) - (\text{Arc } CK) \tag{1}$$

Figure 6:
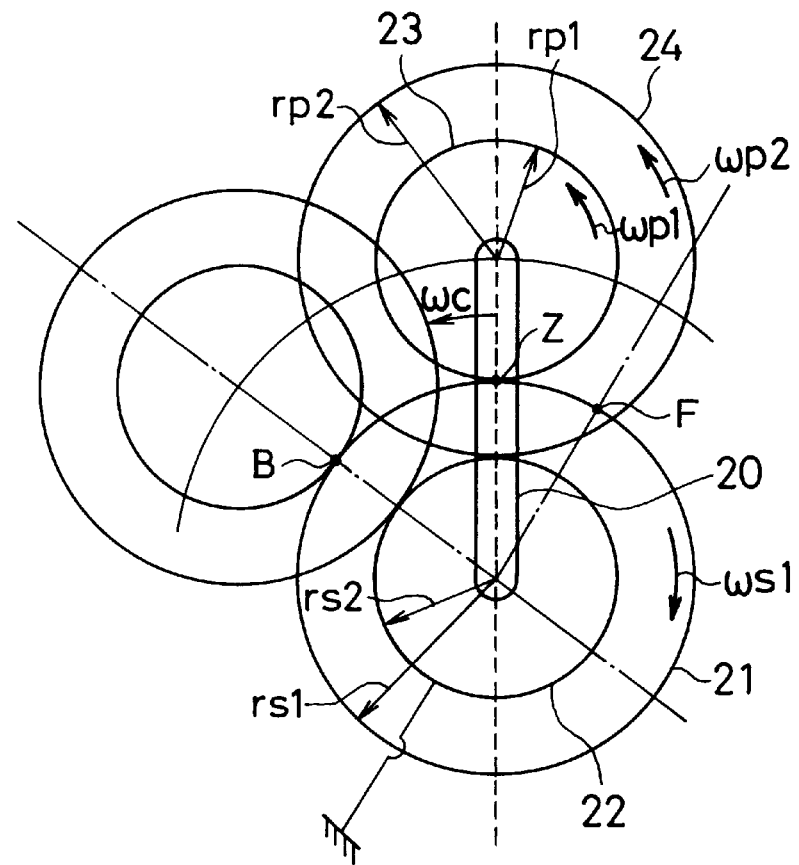
FIG. 6 is a view for explaining an operation of a differential limiting apparatus according to a first embodiment of the present invention when a second sun gear is fixed.

Further, in FIG. 6, when the second sun gear 22 is fixed, the following equation is obtained on the circle with a radius rs1:

$$(\text{Arc } ZF) = (\text{Arc } BF) - (\text{Arc } BZ) \tag{2}$$

Further, the equations (1) and (2) are expressed respectively in the following equations:

$$\omega_{s2} \cdot r_{s2} = -\omega_{p2} \cdot r_{p2} + \omega_c \cdot r_{s2} \tag{3}$$

$$\omega_{s1} \cdot r_{s1} = -\omega_{p1} \cdot r_{p1} + \omega_c \cdot r_{s1} \tag{4}$$

were $\omega_{s1}$ is a angular velocity of the first sun gear 21, $\omega_{s2}$ is an angular velocity of the second sun gear 22, $r_{s2}$ is a pitch circle radius of the first sun gear 21, $r_{s2}$ is a pitch circle radius of the second sun gear 22, $\omega_{p1}$ is a angular velocity of the first pinion 23, $\omega_{p2}$ is an angular velocity of the second pinion 24, $r_{p1}$ is a pitch circle radius of the first pinion 23, $r_{p2}$ is a pitch circle radius of the second pinion 24, and $\omega_c$ is an angular velocity of the carrier 20.

Since the first pinion 23 is integral with the second pinion 24, $\omega_{p1}$ is equal to $\omega_{p2}$, therefore the equations (3) and (4) can be rewritten as follows:

$$\omega_c \cdot (r_{s2} - r_{s1} \cdot r_{s2}/r_{p1}) = \omega_{s2} \cdot r_{s2} - \omega_{s1} \cdot r_{s1} \cdot r_{p2}/r_{p1} \tag{5}$$

Further, substituting rotational speed for angular velocity and number of teeth for pitch circle radius, the equation (5) can be expressed as follows:

$$N_R \cdot (Z_{s2} - Z_{s1} \cdot Z_{p2}/Z_{p1}) = N_L \cdot Z_{s2} - N_i \cdot Z_{s1} \cdot Z_{p2}/Z_{p1} \tag{5'}$$

where the angular speed $\omega_{s1}$ of the first sun gear 21 is replaced with an input rotational speed $N_i$, the angular speed $\omega_c$ of the carrier 20 is replaced with a rotational speed $N_R$ of the front right wheel, the angular speed $\omega_{s2}$ of the second sun gear 22 is replaced with a rotational speed $N_L$ of the front left wheel, the pitch circle radius $r_{s1}$ of the first sun gear 21 is replaced with a number of teeth $Z_{s1}$, the pitch circle radius $r_{s2}$ of the second sun gear 22 is replaced with a number of teeth $Z_{s2}$, the pitch circle radius $r_{p1}$ of the first pinion 23 is replaced with a number of teeth $Z_{p1}$, and the pitch circle radius $r_{p2}$ of the second pinion 24 is replaced with a number of teeth $Z_{p2}$.

Further, letting $Z_{p1}=24$, $Z_{p2}=24$, $Z_{s1}=30$ and $Z_{s2}=15$, the equation (5)' is:

$$N_L + N_R = 2N_i$$

When $N_i \neq 0$, an inequality $N_L > N_i > N_R$ or $N_R > N_i > N_L$ is formed between $N_L$, $N_R$ and $N_i$. It is understood from this that the front right wheel rotational speed $N_R$ has the same rotational direction as the front left wheel rotational speed $N_L$, thus the differentiation has been accomplished.

Next, a function of even torque distribution will be described with reference to FIGS. 7, 8, 9 and 10.

The following equations are formed:

$$T_i = T_R + T_L \tag{6}$$

$$r_{s1} + r_{p1} = r_{s2} + r_{p2} \tag{7}$$

where $T_i$ is an input torque of the first sun gear 21, $T_R$ is a front right side torque of the carrier 20, $T_L$ is a front left side torque of the second sun gear 22, $r_{s1}$ is an intermeshing pitch circle radius of the first sun gear 21, $r_{p1}$ is an intermeshing pitch circle radius of the first pinion 23, $r_{s2}$ is an intermeshing pitch circle radius of the second sun gear 22, and $r_{p2}$ is an intermeshing pitch circle radius of the second pinion 24.

Further, since a tangential load P acting at the meshing point between the first sun gear 21 and the pinion 23 is equal to a sum of a tangential load $P_1$ acting on the carrier 20 and a tangential load $P_2$ acting at the meshing point between the second sun gear 22 and the second pinion 24 and since $P=T_i/r_{s1}$, $P_1=T_R/(r_{s1}+r_{p1})$ and $P_2=T_L/r_{s2}$, the following equation is obtained:

$$T_i/r_{s1} = \{(T_R/(r_{s1}+r_{p1}))\} + T_L/r_{s2} \tag{8}$$

Substituting the equations (6) and (7) into the equation (8), $$T_R = (1 - r_{p1} \cdot r_{s2}/r_{s1} \cdot r_{p2}) \cdot T_i \tag{9}$$

$$T_L = (r_{p1} \cdot r_{s2}/r_{s1} \cdot r_{p2}) \cdot T_i \tag{10}$$

Thus, it is understood that the torque distribution between the front right side torque $T_R$ and the front left side torque $T_L$ can be varied arbitrarily by changing the intermeshing pitch circle radii of the first and second sun gears 21, 22 and the first and second pinions 23, 24, respectively.

Here, replacing the intermeshing pitch circle radii $r_{s1}$, $r_{s1}$, $r_{p1}$ and $r_{p2}$ with the numbers of teeth $Z_{s1}$, $Z_{s2}$, $Z_{p1}$ and $Z_{p2}$ and substituting the aforementioned numbers ($Z_{p1}=24$, $Z_{p2}=24$, $Z_{s1}=30$ and $Z_{s2}=15$) into these numbers of teeth, $T_R=0.5$ $T_i$ and $T_L=0.5$ $T_i$ are obtained. Therefore, the torque distribution ratio between left and right wheels becomes around 50:50 by which torque is equally distributed.

Describing the function of differential limiting according to the first embodiment in more detail, the first gear train composed of the first sun gear 21 and the first pinion 23 has respective teeth with a specified helix angle and further the second gear train composed of the second sun gear 22 and the second pinion 24 has respective teeth with a different specified helix angle than the first gear train. Therefore, the thrust loads acting at the meshing points between the first sun gear 21 and the first pinion 23 act in the direction of the planetary pin 28 without being canceled by the thrust loads acting at the meshing points between the second sun gear 22 and the second pinion 24. As a result, a sliding friction force is generated at the end surface of the washer 29. Further, a rotational friction force generates at the planetary pin 28 due to the resultant force of the separating loads and the tangential loads acting at the meshing points of these gears. The sum of these friction forces acts as a friction torque proportional to the input torque in the opposite direction to the rotational direction of the pinion. This friction torque is a differential limiting torque.

The rotating direction of the pinion varies according to a larger one between the front right wheel rotation number $N_R$ and the front left wheel rotation number $N_L$ and therefore the differential limiting torque applied also varies. As a result of this, the driving force distribution between left and right wheels changes automatically in accordance with the difference of the differential limiting torque when the right wheel slips ($N_R > N_L$) or when the left wheel slips ($N_R < N_L$).

Figure 7:
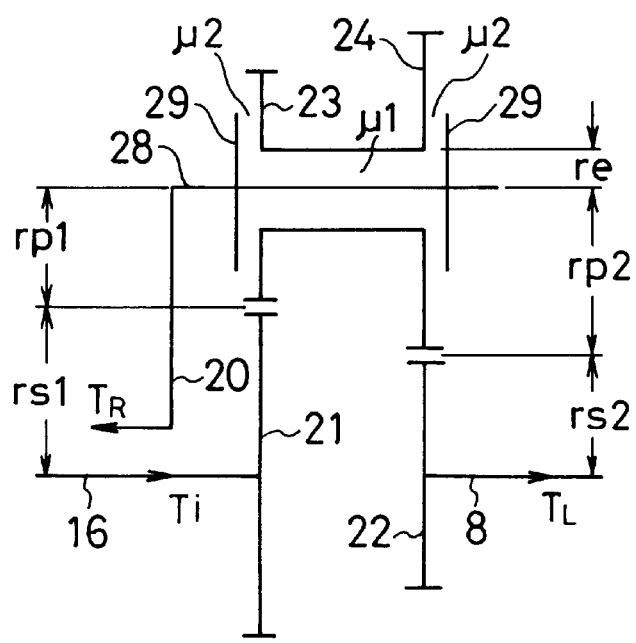
FIG. 7 is a view for explaining a driving force distribution and a differentiation of a differential limiting apparatus according to a first embodiment of the present invention.
Figure 8:
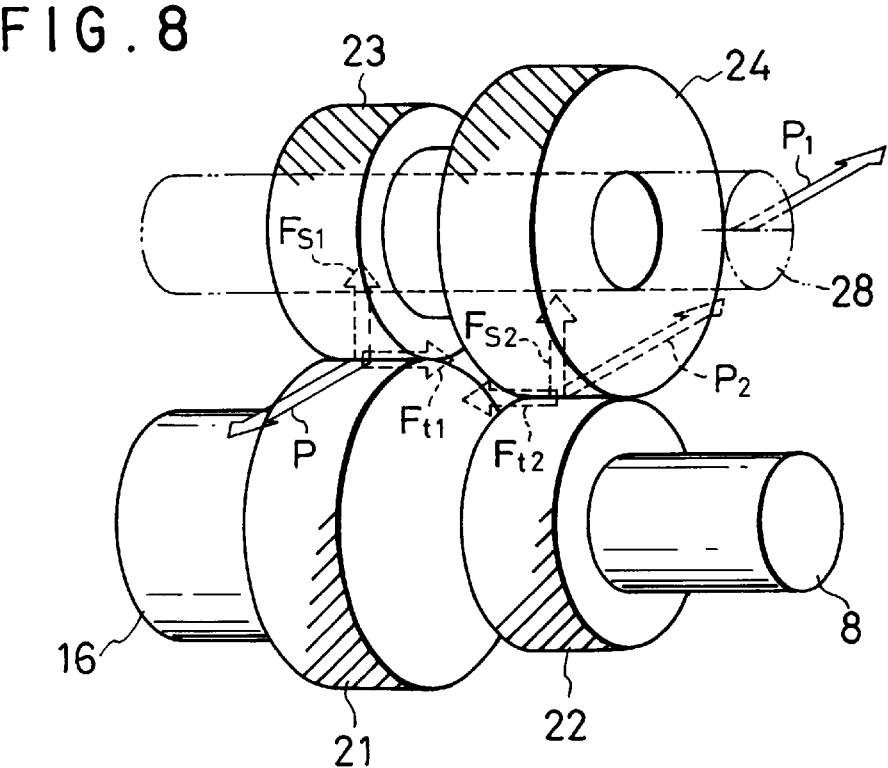
FIG. 8 is a view for explaining loads generated in respective gears of a differential limiting apparatus according to a first embodiment of the present invention.
Figure 9:
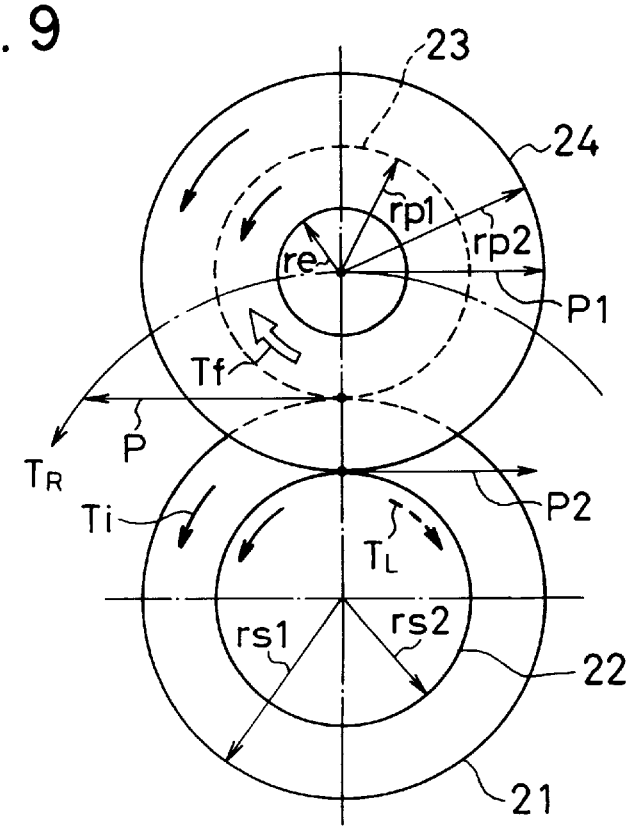
FIG. 9 is a view for explaining an operation of a differential limiting apparatus according to a first embodiment of the present invention when a left wheel speed is larger than a right wheel speed.

First, the case of $N_R > N_L$ will be described with reference to FIGS. 7, 8 and 9. Under this condition, when the input torque $T_i$ is inputted to the first sun gear 21 in the counterclockwise direction as shown in FIG. 9, the first and second pinions 23, 24 rotate on the pinion shaft in the same direction and the second sun gear 22 and the carrier 20 also rotate in the same counterclockwise direction. Consequently, the friction torque $T_f$ of the pinion side acts in the clockwise direction opposite to the pinion.

The tangential load P, the separating load $F_{s1}$ and the thrust load $F_{t1}$ acting on the tooth surfaces of the first sun gear 21 and the first pinion 23 are expressed respectively as follows:

$$F_{s1} = P \cdot \tan \alpha_1 / \cos \beta_1$$

$$F_{t1} = P \cdot \tan \beta_1$$

where $\alpha_1$ is a pressure angle of the first pinion 23 and $\beta_1$ is a helix angle thereof.

Therefore, the resultant force $N_{p1}$ acting on the planetary pin 28 is calculated as follows:

$$N_{p1} = (P^2 + F_{s1}^2)^{1/2} \tag{11}$$
$$= P\{1 + (\tan\alpha_1 / \cos\beta_1)^2\}^{1/2}$$

Similarly, the separating load $F_{s2}$ and the thrust load $F_{t2}$ acting between the second sun gear 22 and the second pinion 24 are expressed as follows:

$$F_{s2} = P_2 \cdot \tan \alpha_2 / \cos \beta_2$$

$$F_{t2} = P_2 \cdot \tan \beta_2$$

where $P_2$ is a tangential load acting between the second sun gear 22 and the second pinion 24, $\alpha_2$ is a pressure angle of the second pinion 24 and $\beta_2$ is a helix angle thereof. Therefore, the resultant force $N_{p2}$ acting on the pinion shaft 58 is calculated as follows:

$$N_{p2} = (P_2^2 + F_{s2}^2)^{1/2} \tag{12}$$
$$= P_2\{1 + (\tan\alpha_2 / \cos\beta_2)^2\}^{1/2}$$

Further, the remaining thrust load $\Delta F_t$ which is generated in the first and second pinions 22 and 24 is as follows:

$$\Delta F_t = F_{t2} - F_{t1} \tag{13}$$
$$= P_2 \cdot \tan\beta_2 - P \cdot \tan\beta_1$$

The friction torque $T_f$ is a sum of the friction force by the resultant force of $N_{p1}$ and $N_{p2}$ and the friction force by the remaining thrust force $\Delta F_t$ and it is expressed as follows:

$$T_f = \mu_1 \cdot re \cdot (N_{p1} + N_{p2}) + \Delta F_t \cdot \mu_2 \cdot n \cdot 2/3 \cdot \{(rd^3 - re^3)/(rd^2 - re^2)\} \tag{14}$$

where $\mu_1$ is a friction coefficient between the pinion member 27 and the planetary pin 28, re is a radius of the inner diameter of the pinion, $\mu_2$ is a sliding friction coefficient at the washer 29, rd is a radius of the outer diameter of the washer 29, and n is a number of contact surfaces.

The following equation is obtained from the torque balance of the first and second pinions 23 and 24:

$$T_f + P \cdot r_{p1} = P_2 \cdot r_{p2} \tag{15}$$

Further, the equation (10) is rewritten by adding friction torque $T_f$ as follows:

$$T_L = T_i(r_{p1} \cdot r_{s2}/r_{s1} \cdot r_{p2}) + T_f r_{s2}/r_{p2} \tag{16}$$

Here, replacing the intermeshing pitch circle radiuses $r_{s1}$, $r_{s2}$, $r_{p1}$ and $r_{p2}$ with the number of teeth of each gear $Z_{s1}$, $Z_{s2}$, $Z_{p1}$ and $Z_{p2}$ and further substituting the aforementioned numbers of teeth ($Z_{p1}$=24, $Z_{p2}$=24, $Z_{s1}$=30 and $Z_{s2}$=15) into these numbers of teeth, the above formula (16) can be written as follows:

$$T_L = 0.5 T_i + 0.625 T_f \tag{17}$$

Since $T_i = T_R + T_L$, substituting this into the formula (16), the following formula is obtained:

$$T_R = T_i(1 - r_{p1} \cdot r_{s2}/r_{s1} \cdot r_{p2}) - T_f r_{s2}/r_{p2} \tag{18}$$

Further, replacing these pitch circle radii $r_{s1}$, $r_{s2}$, $r_{p1}$ and $r_{p2}$ with the number of teeth of each gear $Z_{s1}$, $Z_{s2}$, $Z_{p1}$ and $Z_{p2}$, the formula (18) is expressed as follows:

$$T_R = 0.5 T_i - 0.625 T_f \tag{19}$$

Here, if $\mu_1$=0 and $\mu_2$=0, $T_f$=0. The value of left and right wheel torques $T_L$ and $T_R$ show the same distribution of torque as the aforementioned case of even torque distributing function.

It is understood that the differential limiting torque $T_f \cdot r_{s2}/r_{p2}$ which is proportional to the friction torque $T_f$ is generated and that the magnitude of distributed torque to the front left wheel is increased by the amount of differential limiting torque and the magnitude of distributed torque to the front right wheel is decreased by as much. Further, it is understood that the differential limiting torque is proportional to the input torque because the resultant forces $N_{p1}$, $N_{p2}$ and the remaining thrust force $\Delta F_t$ are proportional to the input torque, respectively.

On the other hand, the remaining thrust force $\Delta F_t$ can be changed by adjusting the helix angles $\beta_1$, $\beta_2$ of the first and second pinions 23, 24 respectively. Further, it is possible to change the friction coefficient $\mu_1$ by altering the type of the bearing (for example, needle bearing, bushing or the like) between the pinion member 27 and the planetary pin 28. Thus, the magnitude of the differential limiting torque can be established to be various values together with the friction torque $T_f$.

Figure 10:
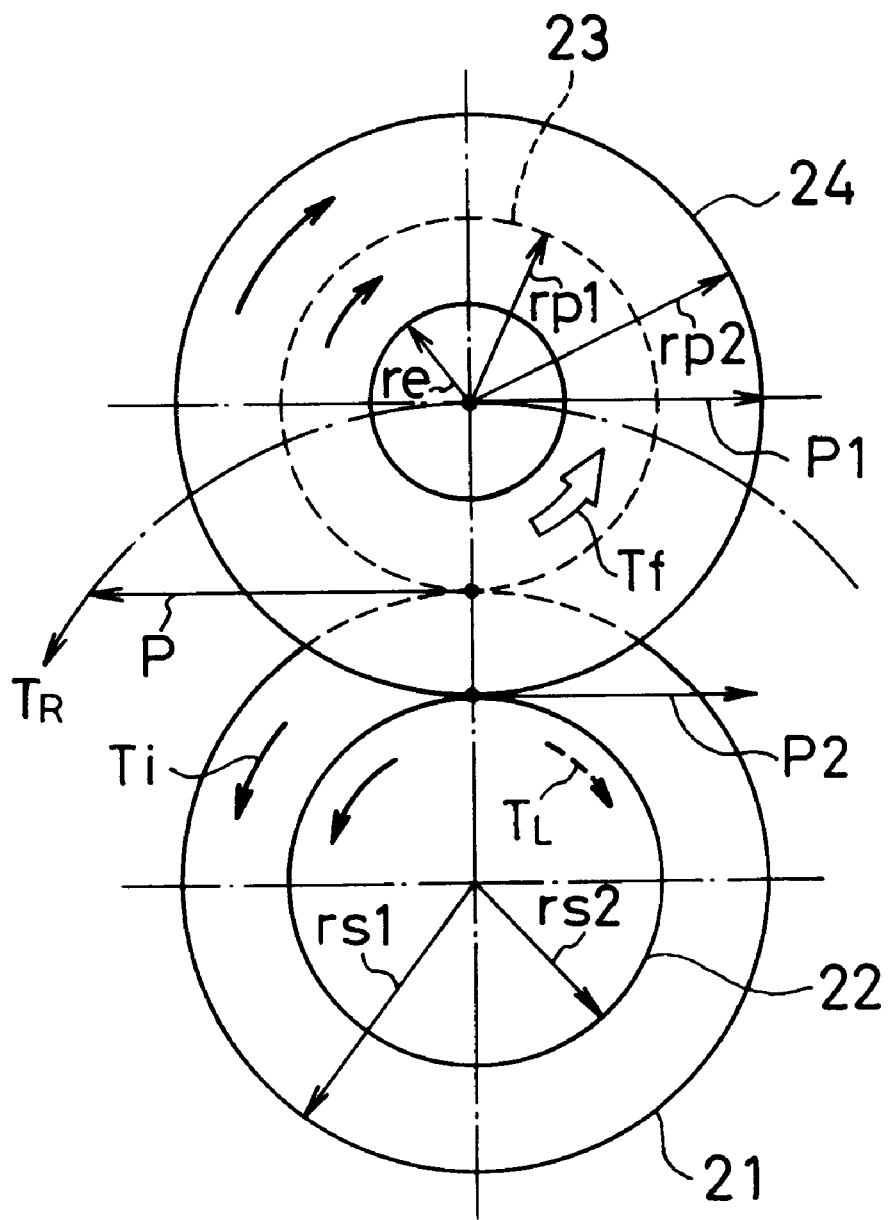
FIG. 10 is a view for explaining an operation of a differential limiting apparatus according to a first embodiment of the present invention when a left wheel speed is smaller than a right wheel speed.

Next, the case of $N_L > N_R$ will be described with reference to FIG. 10. Under this condition, the first and second pinions 23, 24 revolve around the first sun gear 21 and the second sun gear 22 respectively while rotating on the planetary pin 28 in the clockwise direction and the friction torque $T_f$ acts in the unticlockwise direction. Therefore, the torque balance within the first and second pinions 23, 24 is expressed in the following equation:

$$T_f + P_2 \cdot r_{s2} = P \cdot r_{p1} \tag{20}$$

Undertaking the same calculation as before, the front left wheel torque $T_L$ and the front right wheel torque $T_R$ are calculated as follows:

$$T_R = T_i(1 - r_{p1} \cdot r_{s2}/r_{s1} \cdot r_{p2}) + T_f r_{s2}/r_{p2} \tag{21}$$

$$T_R = 0.5 T_i + 0.625 T_f \tag{22}$$

$$T_L = T_i(r_{p1} \cdot r_{s2}/r_{s1} \cdot r_{p2}) - T_f r_{s2}/r_{p2} \tag{23}$$

$$T_L = 0.5 T_i - 0.625 T_f \tag{24}$$

Thus, also under this condition, it is understood that the same differential limiting torque, $T_f \cdot r_{s2}/r_{p2}$ is generated.

Further, it is understood that, inversely to the case of $N_R>N_L$, the magnitude of the front left wheel torque $T_L$ is decreased by the amount of the differential limiting torque and the magnitude of the front right wheel torque $T_R$ is increased by as much.

An operation of the differential limiting apparatus thus constituted will be described using a torque characteristic diagram shown in FIG. 11.

First, a driving force transmitted from the engine 1 is inputted to the automatic transmission 3 through the torque converter 2 and the input shaft 2a and the driving force converted by the automatic transmission 3 is inputted to the differential limiting apparatus 7 through the primary reduction drive gear 4, the primary reduction driven gear 5 and the final drive gear 6. Further, the driving force is transferred to the final driven gear 16 and the differential case 18 in this order and inputted to the first sun gear 21.

Further, the driving force is divided into two ways, one being distributed to the second sun gear 22 through the first and second pinions 23, 24 and another being distributed to the carrier 20 supporting the first and second pinions 23, 24. The driving force distributed to the sun gear 22 is transmitted to the front left wheel 10 through the left drive shaft 8 and the left axle shaft 9. On the other hand, the driving force distributed to the carrier 20 is transmitted to the front right wheel 13 through the right drive shaft 11 and the right axle shaft 12.

When the vehicle travels in a straight line, since $N_L=N_R$, the second sun gear 22 rotates in the same direction and at the same speed as the carrier 20 does while the first and second pinions 23, 24 stop rotation around the planetary pin 28.

Because of the inoperative first and second pinions 23, 24, there arises no friction torque between the pinions and the carrier. The front left and right wheel torques $T_L$ and $T_R$ are established respectively to be a standard torque distribution ratio which is determined by gear specifications, in this embodiment to be equal (50:50) as shown by a straight line $L_0$ in FIG. 11.

When the front right wheel slips, since $N_R>N_L$, the first and second pinions 23, 24 make a planetary rotation to produce differentiation based on the gear specifications. Therefore, when the vehicle turns, the difference between left and right wheels in rotation number is absorbed so as to enable a smooth turn.

Further, the planetary rotation of the first and second pinions 23, 24 is accompanied by a thrust load produced from the difference in the helix angles thereof. The thrust load acts on the washer 29 at either end of the pinions 23, 24. Further, the resultant force of the separating and tangential forces at the meshing portions of the gears acts on the first and second pinions 23, 24 and the planetary pin 28, respectively. Both of the thrust load and resultant force generate a friction torque in the opposite direction to the rotational direction of the pinions and this friction torque acts as a differential limiting torque.

Figure 11:
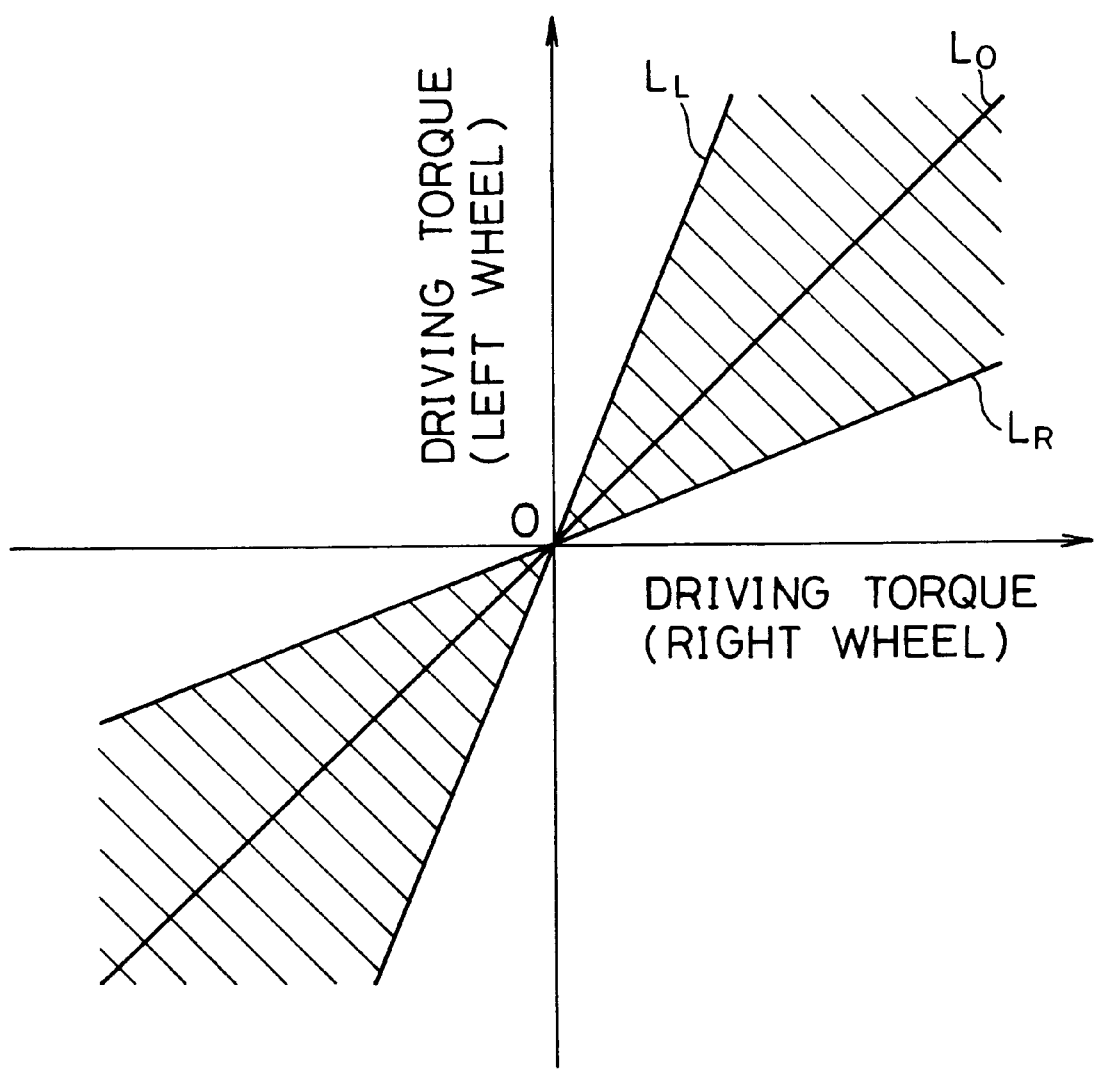
FIG. 11 is a view showing a characteristic of torque distribution into a left and right wheels of a differential limiting apparatus according to a first embodiment of the present invention.

Under this condition, since the differential limiting torque acts so as to restrict the rotation of the carrier 20, that amount of the differential limiting torque transfers to the front left wheel side and a larger amount of torque than the standard torque distribution ratio is distributed to the front left wheel as shown by a straight line $L_L$ in FIG. 11, thereby the front right wheel being prevented from slipping when the vehicle going straight.

When the front left wheel slips, since $N_L>N_R$, similarly, the difference between the first and second pinions 23, 24 in rotation number produces a planetary rotation, thereby a friction torque is generated.

Under this condition, since the differential limiting torque acts so as to encourage the rotation of the carrier 20, that amount of the differential limiting torque transfers to the front right wheel side and a larger amount of torque than the standard torque distribution ratio is distributed to the front right wheel as shown by a straight line $L_R$ in FIG. 11, thereby the front left wheel being prevented from slipping.

Because the differential limiting torque generates in proportional to the input torque, the distribution ratio between left and right wheels is always constant, therefore the differential limiting ability is always displayed at a constant rate.

Thus, the differential limiting apparatus according to the first embodiment of the present invention provides a greater number of advantages over the prior art such as a simple construction, small number of components, a compact and light weight body, a good workability, an easy assembly, an excellent vibration/noise characteristic, a good response, an improved maneuverability, and the like.

Figure 12:
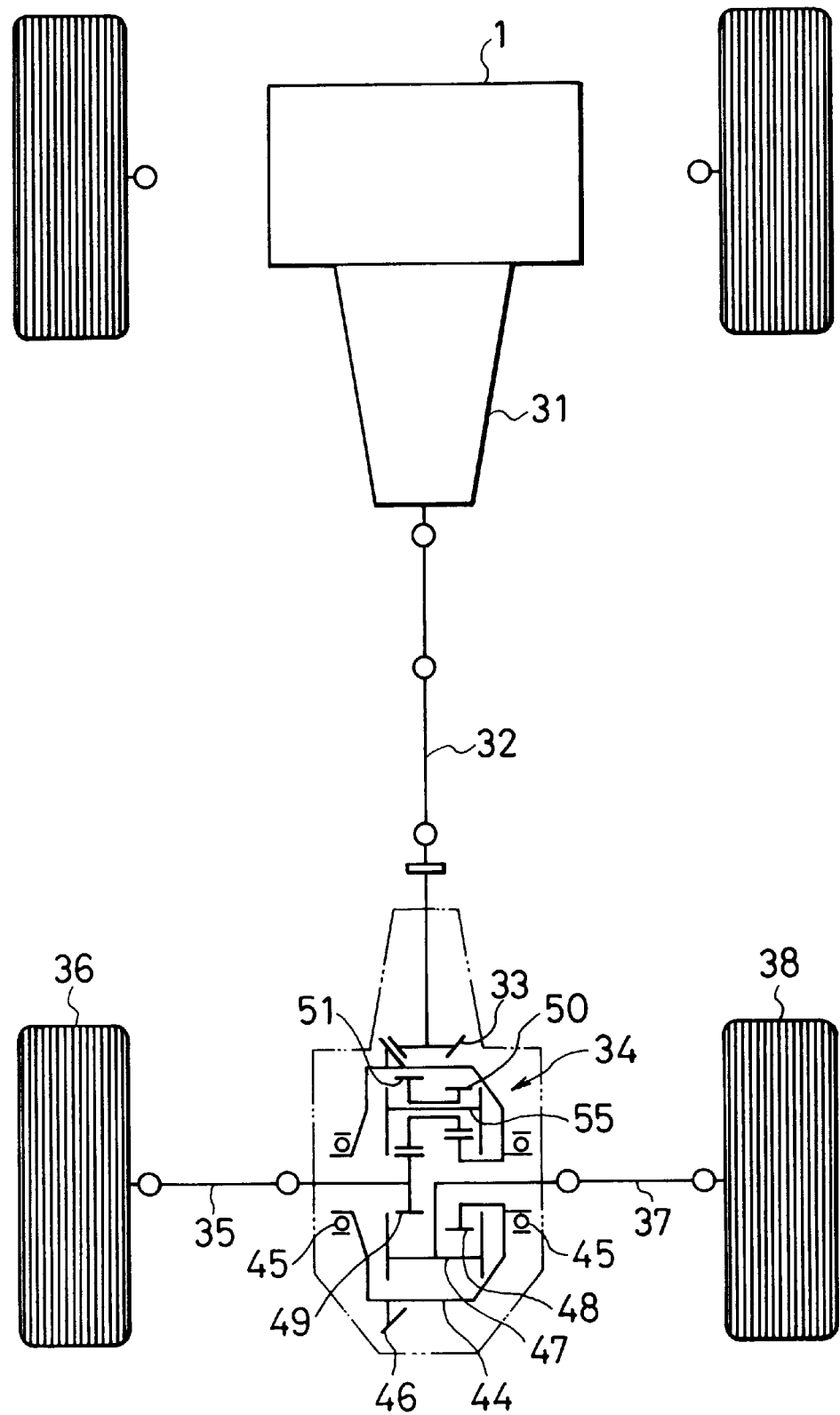
FIG. 12 is a schematic drawing showing a differential limiting apparatus applied to a front engine rear drive (FR) vehicle according to a second embodiment of the present invention.
Figure 13:
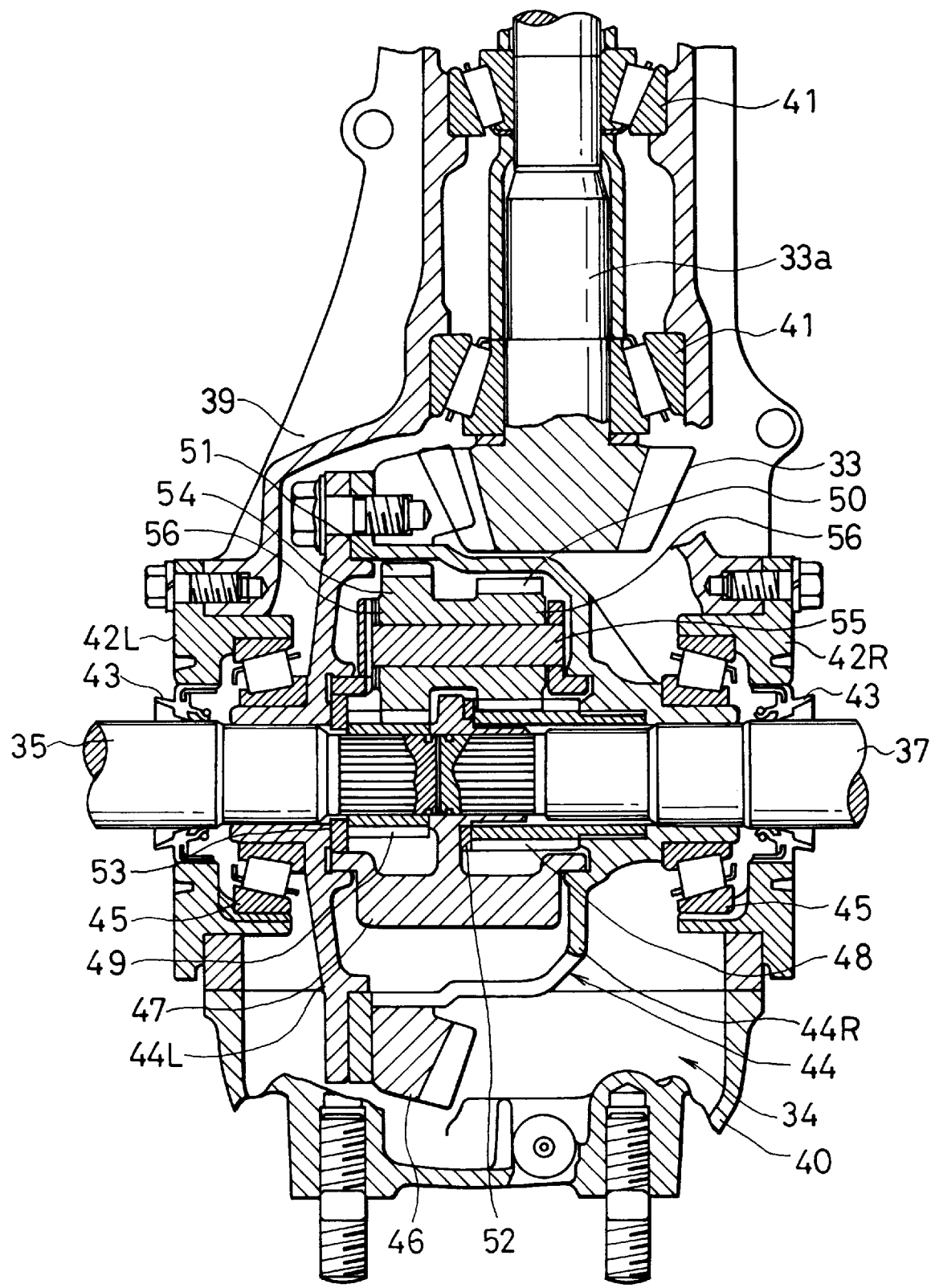
FIG. 13 is an enlarged fragmentary sectional drawing showing a differential limiting apparatus according to a second embodiment of the present invention.

FIG. 12 and FIG. 13 show a second embodiment of the present invention. The second embodiment presents a differential limiting apparatus applied to a front engine rear drive (FR) vehicle. Referring to FIG. 12, the driving force from the engine 1 is inputted to a differential limiting apparatus 34 for rear wheels through a transmission 31, a propeller shaft 32 and a drive pinion 33. Further, the driving force is transmitted from the differential limiting apparatus 34 to a rear left wheel 36 through a left axle shaft 35 and to a rear right wheel 38 through a right axle shaft 37, respectively.

As shown in FIG. 13, the drive pinion 33 and the differential limiting apparatus 34 are accommodated in a rear differential carrier 39. Further, the rear differential carrier 39 is covered at the rear end thereof with a rear cover 40.

The drive pinion 33 is rotatably supported at its shaft portion 33 which is connected with the propeller shaft 32 by bearings 41, 41.

The left axle shaft 35 is rotatably fit through a hole provided in a left side retainer 42L connected to the rear differential carrier 39 and, on the same axis as the left axle shaft 35, the right axle shaft 37 is rotatably fit through a hole provided in a right side retainer 42R connected to the rear differential carrier 39. Respective holes are sealed by an oil seal 43, 43.

Further, the outer periphery of the left axle shaft 35 is rotatably fit to a left differential case 44L which is supported through a bearing 45 by the left side retainer 42L.

The left differential case 44L is connected with one end of an right differential case 44R. A crown gear 46 is mounted at the connecting portion of the left differential case 44L and the right differential case 44R on the same axis of rotation as the left and right differential cases 44L, 44R. The outer periphery of the right axle shaft 37 is rotatably fit to the other end of the right differential case 44R. Further, the right differential case 44R is rotatably supported through the bearing 45 by the right side retainer 42R. That is, the differential case 44 comprising the left and right differential cases 44L, 44R and the crown gear 46 is rotatably supported within the rear differential carrier 39.

A carrier 47 is provided in the differential case 44 rotatably about the same axis as the differential case 44. The left and right axle shafts 35, 37 are inserted into the carrier 47 and the right axle shaft 37 is connected with the carrier 47 through splines provided at the left end thereof.

The right differential case 44R is connected inside thereof with a first sun gear 48 having a large diameter through splines and on the other hand the left axle shaft 35 is connected at the right end thereof with a second sun gear 49 having a small diameter. The first sun gear 48 meshes with a first pinion 50 having a small diameter, forming a first gear train and the second sun gear 49 meshes with a second pinion 51 having a large diameter, forming a second gear train. Further, there are provided washers 52 and 53 between the first sun gear 48 and the carrier 47 and between the second sun gear 49 and the left differential case 44L, respectively.

The first and second pinions 50, 51 are formed integrally with a pinion member 54. In this embodiment, three pinion members 54, 54 and 54 are rotatably mounted on respective planetary pins 55 fixed to the carrier 47. Further, a washer 56 is provided between both ends of the respective pinion member 54 and the carrier 47 in order to support a thrust load generated from the pinion member 54, respectively.

The driving force conveyed from the drive pinion 33 is transmitted to the first sun gear 48 through the crown gear 46 and the differential case 44 and further transmitted to the left axle shaft 35 through the pinion member 54 and the second sun gear 49. On the other hand, the driving force from the first sun gear 48 is transmitted to the right axle shaft 37 through the carrier 47. Thus, a compound planetary gear type differential limiting apparatus is constituted.

This compound planetary type differential limiting apparatus acts as a differential by properly selecting the number of teeth of the first and second sun gears 48, 49 and the first and second pinions 50, 51.

Also, the apparatus has a function of an even torque distribution of 50:50 by properly establishing the intermeshing pitch circle radii of the first and second sun gears 48, 49 and the first and second pinions 50, 51.

Further, in this differential limiting apparatus, both first and second gear trains have teeth with helix angles and further a respective helix angle is different from each other. As a result, some amount of thrust forces are offset and some are reserved. The reserved thrust forces generate a friction torque at one end of the pinion member 54. On the other hand, the gear meshes produce separating forces and tangential forces in the first and second pinions 50, 51 and the planetary pin 55 and the resultant force generates another friction torque. These friction torques act as a differential limiting torque, a differential limiting function being provided in the differential limiting apparatus 34.

The differential function, the even torque distribution function and the differential limiting function have been described in the first embodiment. Therefore a detailed description is omitted here.

Next, an operation of the differential limiting apparatus according to the second embodiment will be described.

First, the driving force of the engine 1 is inputted to the differential limiting apparatus 34 through the transmission 31, the propeller shaft 32, and the drive pinion 33. Then, the driving force is transmitted to the first sun gear 48 through the crown gear 46 and the differential case 44.

Further, the driving force is divided into two ways, one transmitted to the second sun gear 49 through the first and second pinions 50, 51 and the other transmitted to the carrier 47 supporting the first and second pinions 50, 51. The driving force conveyed to the second sun gear 49 is further transmitted to the rear left wheel 36 through the left drive axle 35 and the driving force conveyed to the carrier 47 is transmitted to the rear right wheel 38 through the right axle shaft 37.

When the rear left wheel rotates at the same rotation speed as the rear right wheel ($N_L = N_R$), since the second sun gear 49 rotates at the same speed in the same direction as the carrier 47, the first and second pinions 50, 51 stop the planetary rotation and rotate integrally with the carrier 47.

This integral rotation of the first and second pinions 50, 51 and the carrier 47 does not produce friction between both, therefore, the torque distribution between the rear left and rear right wheels is established at the standard torque distribution ratio determined according to gear specifications, that is, in this embodiment, around 50:50.

When the rear right wheel rotates faster than the rear left wheel ($N_R > N_L$), i.e., when the rear right wheel causes slipping, then the first and second pinions 50, 51 make a planetary rotation to produce differentiation between the rear left and rear right wheels, this providing the vehicle with a smooth turn.

Further, the planetary rotation of the first and second pinions 50, 51 is accompanied by a thrust load produced from the difference in the helix angles thereof. The thrust load acts on the washer 56 at either end of the pinions 50, 51. Further, the resultant force of the separating and tangential forces at the meshing portions of the gears acts on the first and second pinions 50, 51 and the planetary pin 55, respectively. Both of the thrust load and resultant force generate a friction torque in the opposite direction to the rotational direction of the pinions and this friction torque acts as a differential limiting torque.

Under this condition, since the differential limiting torque acts so as to restrict the rotation of the carrier 47, that amount of the differential limiting torque transfers to the rear left wheel side and a larger amount of torque than the standard torque distribution ratio is distributed to the rear left wheel, thereby the rear right wheel being prevented from slipping when the vehicle going straight.

When the front left wheel slips, since $N_L > N_R$, similarly, the difference between the first and second pinions 50, 51 in rotation number produces a planetary rotation, whereby a friction torque is generated.

Under this condition, since the differential limiting torque acts so as to encourage the rotation of the carrier 47, that amount of the differential limiting torque transfers to the rear right wheel side and a larger amount of torque than the standard torque distribution ratio is distributed to the rear right wheel, thereby the rear left wheel being prevented from slipping.

Because the differential limiting torque generates in proportional to the input torque, the distribution ratio between rear left and rear right wheels is always constant, therefore the differential limiting ability is always displayed at a constant rate.

Thus, the differential limiting apparatus according to the second embodiment of the present invention provides a vehicle with a greater number of advantages than the one according to the prior art, such as a simple construction, small number of components, a compact and light weight body, easy assembling, an excellent vibration/noise characteristic, a good response, an improved maneuverability and the like.

Figure 14:
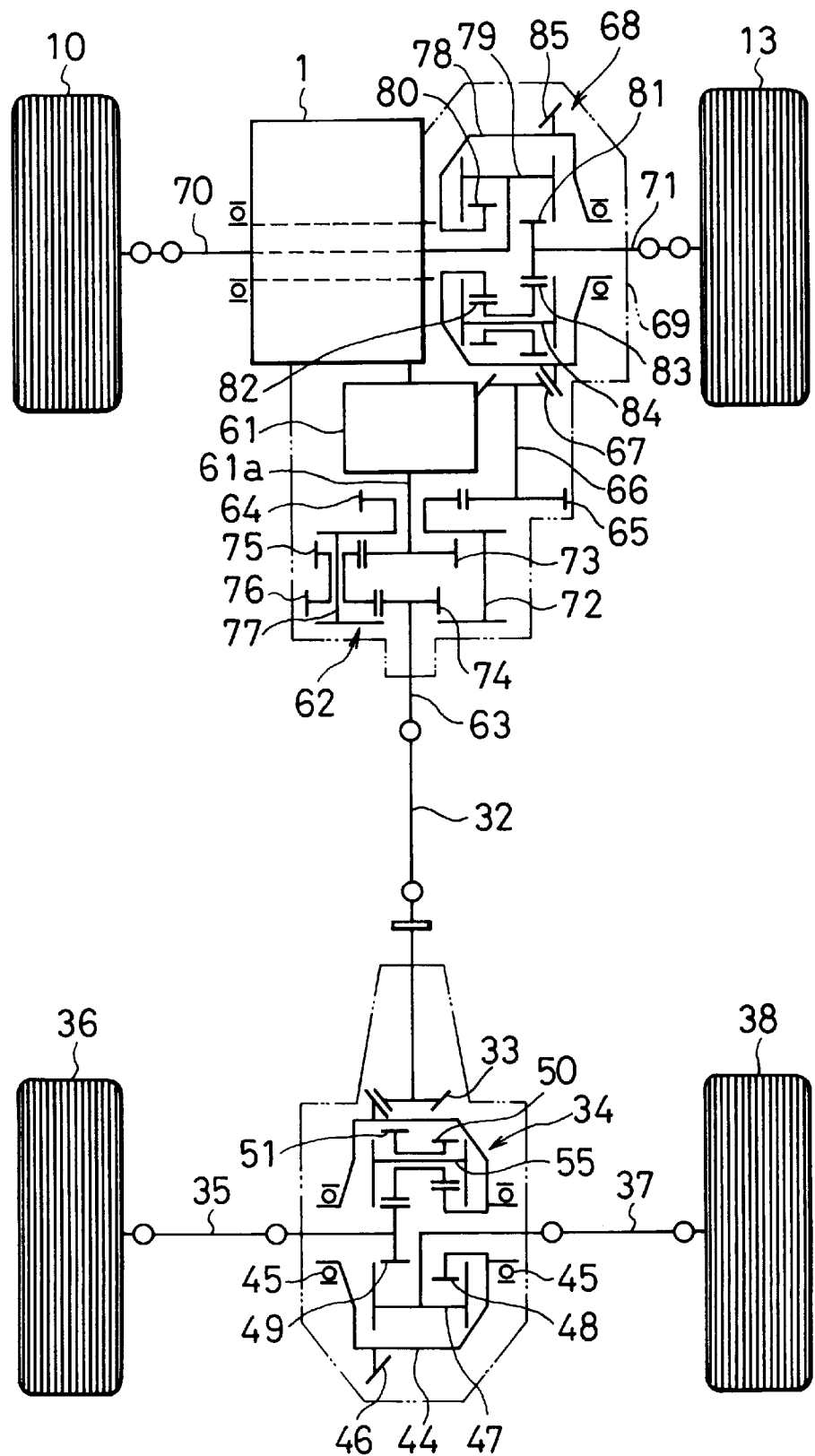
FIG. 14 is a schematic drawing showing a differential limiting apparatus applied to a four wheel drive vehicle with a center differential according to a third embodiment of the present invention.

FIG. 14 shows an third embodiment in which a differential limiting apparatus according to the present invention is applied to front and rear axles of a four wheel drive vehicle having a center differential.

The driving force of the engine 1 is transmitted to a center differential 62 through an automatic transmission 61 including a torque converter and a transmission output shaft 61a. The driving force from the center differential 62 is divided into two ways, one is transmitted to the rear differential limiting apparatus 34 through a rear drive shaft 63, a propeller shaft 32 and a drive pinion 33 and the other is transmitted to the front differential limiting apparatus 68 through a transfer gear 64, a transfer driven gear 65, a front drive shaft 66 and a drive pinion 67. In this embodiment, the automatic transmission 61, the center differential 62 and the front differential limiting apparatus 68 are accommodated integrally within a case 69 and therefore a common lubrication system using ATF is incorporated.

The driving force inputted to the rear differential limiting apparatus 34 is transmitted to a rear left wheel 36 through a left axle shaft 35 and to a rear right wheel 38 through a right axle shaft 37.

Further, the driving force inputted to the front differential limiting apparatus 68 is transmitted to a front left wheel 10 through a left axle shaft 70 and also to a front right wheel 13 through a right axle shaft 71.

The center differential 62 is incorporated at the rear portion of the case 69. The transmission output shaft 61a is rotatably inserted in the center differential 62 from ahead and the rear drive shaft 63 is rotatably inserted therein frombehind. In the center differential 62, a carrier 72 is rotatably coupled about the transmission shaft 61a. Further, this transmission output shaft 61a is connected at the rear end thereof with a third sun gear 73 having a large diameter. The rear drive shaft 63 is connected at the front end thereof with a fourth sun gear 74 having a small diameter. These third and fourth sun gears 73, 74 are accommodated in the carrier 72.

The third sun gear 73 meshes with a third pinion 75 having a small diameter, a third gear train being formed. Further, the fourth sun gear 74 meshes with a fourth pinion 76 having a large diameter, a fourth gear train being formed.

The third pinion 75 is formed integrally with the fourth pinion 76 and a plurality of pairs of the pinions, 75, 76 (three pairs in this embodiment) are rotatably supported by respective planetary pins 77 fixed to the carrier 72.

The carrier 72 is connected at the front end thereof with the transfer drive gear 64 so as to output the driving force to the front wheels.

That is, the driving force from the transmission output shaft 61a is transmitted to the third sun gear 73 and then the driving force is transmitted from the fourth sun gear 74 to the rear drive shaft 63 and at the same time from the carrier 72 to the front drive shaft 66 through the transfer drive gear 64 and the transfer driven gear 65. Thus, a compound planetary type center differential is constituted.

This compound planetary type center differential can have a differential function by properly establishing the numbers of teeth of the third and fourth sun gears 73, 74 and a plurality of third and fourth pinions 75, 76 arranged around these sun gears 73, 74. Further, this center differential can have a function of even torque distribution (50:50) or a function of uneven torque distribution between front and rear wheels selectively by means of properly establishing the intermeshing pitch circle radii of the third and fourth sun gears 73, 74 and the third and fourth pinions 75, 76.

Further, the center differential according to the present invention can also have a differential limiting function by means of generating a friction torque between the pinions and the planetary pin or between the pinions and the carrier. The friction torque can be obtained by a thrust force generated in the third and fourth gear trains having helical gears and by a resultant force of the separating and tangential loads at the meshing points between the sun gears and the pinions.

The front differential limiting apparatus 68 is an apparatus corresponding to the front differential limiting apparatus 7 described in the first embodiment of the present invention. A carrier 79 connected with the left axle shaft 70 is rotatably supported by a differential case 78. In the carrier 79, a first sun gear 80 having a large diameter and a second sun gear 81 are rotatably accommodated, respectively. Further, the first sun gear 80 is connected with the differential case 78 and the second sun gear 81 is connected with the right axle shaft 71.

The first sun gear 80 meshes with a first pinion 82 having a small diameter, a first gear train being formed. Further, the second sun gear 81 meshes with a second pinion 83 having a large diameter, a second gear train being formed.

The first pinion 82 is formed integrally with the second pinion 83 and a plurality of pairs of the pinions, 82, 83 (three pairs in this embodiment) are rotatably supported by respective planetary pins 84 fixed to the carrier 79.

Further, a hypoid drive gear 85 is rigidly mounted around the outer periphery of the differential case 78 and meshes with the drive pinion 67.

The driving force from the drive pinion 67 is transmitted to the first sun gear 80 through the hypoid drive gear 85 and the differential case 78. Then, the driving force is outputted from the second sun gear 81 to the right axle shaft 71 and at the same time from the carrier 79 to the left axle shaft 70. Thus, a compound planetary gear type differential limiting apparatus is constituted.

This compound planetary type differential limiting apparatus can have a differential function by properly establishing the numbers of teeth of the first and third sun gears 80, 81 and a plurality of first and second pinions 82, 83 arranged around these sun gears 80, 81.

Further, this differential limiting apparatus can have a function of even torque distribution (50:50) between left and right wheels by means of properly establishing the intermeshing pitch circle radii of the first and second sun gears 80, 81 and the first and second pinions 82, 83.

Further, the differential limiting apparatus according to the present invention can also have a differential limiting function bymeans of generating a friction torque between the pinions and the planetary pin or between the pinions and the carrier. The friction torque can be obtained by a thrust force generated in the first and second gear trains having helical gears and by a resultant force of the separating and tangential loads at the meshing points between the sun gears 80, 81 and the pinions 82, 83.

Next, an operation of thus constituted differential limiting apparatus will be described.

First, the driving force of the engine 1 is inputted to the third sun gear 73 of the center differential 62 through the automatic transmission 61 and the transmission output shaft 61a. Then, the driving force is divided into two ways, one transmitted from the third and fourth pinions 75, 76 to the fourth sun gear 74 and the other transmitted to the carrier 72 supporting the third and fourth pinions 75, 76. The driving force conveyed to the fourth sun gear 74 is transmitted to the rear wheel side through the rear drive shaft 63 and the driving force conveyed to the carrier 72 is transmitted to the front wheel side through the transfer drive gear 64, the transfer driven gear 65 and the front drive shaft 66. Thus, the vehicle can be driven with four wheels.

When the vehicle runs in a straight line, since the front wheel speed $N_F$ is equal to the rear wheel speed $N_B$ ($N_F=N_B$), in the center differential 62 the fourth sun gear 74 rotates at the same speed in the same direction as the carrier 72 and the third and fourth pinions 75, 76 stop the planetary rotation and rotate integrally with the carrier 72.

This integral rotation of the third and fourth pinions 75, 76 together with the carrier 72 does not produce friction torque between both, therefore, the torque distribution between front and rear wheels is established at the standard torque distribution ratio $T_F:T_B$ ($T_F$ is a front wheel torque and $T_B$ is a rear wheel torque) which is determined according to gear specifications, of an even torque distribution ratio of around 50:50 or of an uneven torque distribution ratio.

When the vehicle makes a turn or slips at the front wheel, since the front wheel rotates faster than the rear wheel ($N_F>N_B$), then in the center differential 62 the third and fourth pinions 75, 76 make a planetary rotation to produce differentiation between the front and rear wheels, enabling the vehicle to make a smooth turn due to an absorption of the difference between the front and rear wheels in rotation number.

Further, the planetary rotation of the third and fourth pinions 75, 76 is accompanied by a thrust load produced from the difference in the helix angles thereof. The thrust load acts at either end of the third and fourth pinions 75, 76. Further, the resultant force of the separating and tangential forces at the meshing portions of the gears acts on the third and fourth pinions 75, 76 and the planetary pin 77, respectively. Both of the thrust load and resultant force generate a friction torque in the opposite direction to the rotational direction of the pinions and this friction torque acts as a differential limiting torque.

Under this condition, since the differential limiting torque acts so as to restrict the rotation of the carrier 72, that amount of the differential limiting torque transfers to the rear wheel side and a larger amount of torque than the standard torque distribution ratio is distributed to the rear wheel, thereby the front wheel being prevented from slipping when the vehicle runs straight and an excellent turning ability being obtained when the vehicle turns.

When the rear wheel slips, since $N_B>N_F$, similarly, the difference between the third and fourth pinions 75, 76 in rotation number produces a planetary rotation, thereby a friction torque is generated.

Under this condition, since the differential limiting torque acts so as to encourage the rotation of the carrier 72, that amount of the differential limiting torque transfers to the front wheel side and a larger amount of torque than the standard torque distribution ratio is distributed to the front wheel, thereby the rear wheel being prevented from slipping.

Because the differential limiting torque generates in proportional to the input torque, the distribution ratio between front and rear wheels is always constant, therefore the differential limiting ability is always displayed at a constant rate.

The driving force distributed to the front wheel side is inputted to the first sun gear 80 through the front drive shaft 66, the drive pinion 67, the hypoid drive gear 85 of the front differential limiting apparatus 68 and the differential case 78 thereof.

The driving force conveyed to the first sun gear 80 is distributed to the second sun gear 81 through the first and second pinions 82, 83 and to the carrier 79 supporting the first and second pinions 82, 83. The driving force distributed to the second sun gear 81 is transmitted to the front right wheel 13 through the right axle shaft 71 and the one distributed to the carrier 79 is transmitted to the front left wheel 10 through the left axle shaft 70.

When the vehicle runs in a straight line, since the front left wheel speed $N_L$ is equal to the front right wheel speed $N_R$ ($N_L=N_R$), in the front differential limiting apparatus 68, the second sun gear 80 rotates at the same speed in the same direction as the carrier 79 and the first and second pinions 82, 83 stop the planetary rotation and rotate integrally with the carrier 79.

This integral rotation of the first and second pinions 82, 83 together with the carrier 79 does not produce friction torque between both, therefore, the torque distribution between front left and front right wheels is established at the standard torque distribution ratio $T_L:T_R$ ($T_L$ is a front left wheel torque and $T_R$ is a front right wheel torque) which is determined according to gear specifications, of an even torque distribution ratio of around 50:50.

When the front left wheel slips, since the front left wheel rotates faster than the front right wheel ($N_L>N_R$), then in the differential limiting apparatus 68, the first and second pinions 82, 83 make a planetary rotation to produce differentiation between the left and right wheels, enabling the vehicle to make a smooth turn due to an absorption of the difference between the left and right wheels in rotation number.

Further, the planetary rotation of the first and second pinions 82, 83 is accompanied by a thrust load produced from the difference in the helix angles thereof. The thrust load acts at either end of the first and secondpinions 82, 83. Further, the resultant force of the separating and tangential forces at the meshing portions of the gears acts on the first and second pinions 82, 83 and the planetary pin 84, respectively. Both the thrust load and resultant force generate a friction torque in the opposite direction to the rotational direction of the pinions and this friction torque acts as a differential limiting torque.

Under this condition, since the differential limiting torque acts so as to restrict the rotation of the carrier 79, that amount of the differential limiting torque transfers to the front right wheel side and a larger amount of torque than the standard torque distribution ratio is distributed to the front right wheel, thereby the front left wheel being prevented from slipping when the vehicle runs straight.

When the front right wheel slips, since $N_R>N_L$, similarly, the difference between the first and second pinions 82, 83 of the front differential limiting apparatus 68 in rotation number produces a planetary rotation, thereby a friction torque is generated.

Under this condition, since the differential limiting torque acts so as to encourage the rotation of the carrier 79, that amount of the differential limiting torque transfers to the front left wheel side and a larger amount of torque than the standard torque distribution ratio is distributed to the front left wheel, thereby the front right wheel being prevented from slipping.

Because the differential limiting torque generates in proportional to the input torque, the distribution ratio between left and right wheels is always constant, therefore the differential limiting ability is always displayed at a constant rate.

Further, the driving force distributed to the rear wheel side by the center differential 62 is inputted to the rear differential limiting apparatus 34 through the rear drive shaft 63, the propeller shaft 32 and the drive pinion 33, and distributed between the rear left and rear right wheels by the rear differential limiting apparatus 34, as described in the second embodiment.

Thus, according to the third embodiment of the present invention, since the four wheel drive vehicle incorporates not only the center differential but also the differential limiting apparatus both in the front and rear axles, whenever any one of the four wheels slips or makes an idle rotation, torques proportional to the input torque are properly distributed to the remaining three wheels, i.e., whenever any one loses traction, the remaining ones secure traction, whereby the vehicle driver can enjoy a crisp and stable driving on slippery roads or on rough roads.

The center differential according to the third embodiment of the present invention has advantages such as a simple construction, a small number of components, a lightweight, a compact size, an easy assembling, an excellent noise/vibration characteristic in the power transmission system and the like.

Further, in the center differential of the present invention, it is possible to establish the number of teeth so as to distribute torque between front and rear wheels at 50:50, and to transfer the differential limiting torque proportional to the input torque to front or rear wheels in accordance with running conditions or road conditions, whereby the vehicle can be prevented from slipping or from unstable behaviors such as a tail drift. The torque control proportional to input torque enables an easy behavior control with respect to the fine accelerator control.

Further, the lubrication system of the center differential can be shared with the differential limiting apparatus and in case of employing the automatic transmission it is possible to share ATF among the center differential, the differential limiting apparatus and the automatic transmission. This enables a compactness of the entire casing for accommodating these apparatuses.

In the present invention, examples of the differential limiting apparatus have been applied to vehicles on which an engine is mounted on the front side, however, such examples may be applied to a vehicle having an engine on the rear side thereof. Further, these differential limiting apparatuses can be applied to four wheel drive vehicles equipped with conventional differentials on either of the front or rear side.

Further, according to the present invention helical gears have been employed in the planetary gear set but the type of gear is not limited to helical gears.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A vehicular differential limiting apparatus for inputting a driving force through a final drive gear and distributing said driving force between a left wheel and a right wheel through a left drive shaft and a right drive shaft, respectively, said vehicular differential limiting apparatus comprising:

a final driven gear mounted so as to rotate around a first common axis of rotation and having respective gear teeth for connecting with said final drive gear so as to receive said drive force;

a first sun gear rotating around said first common axis of rotation, having respective teeth and connected with said final driven gear for joint rotation with said final driven gear;

a first pinion meshing with said first sun gear, rotating around a second common axis of rotation and having respective teeth, said second common axis revolving around said first common axis;

a second pinion rotating integrally with said first pinion around said second common axis and having respective teeth;

a second sun gear meshing with said second pinion, rotating around said first common axis, having respective teeth for connecting with said right drive shaft so as to transmit said driving force to said right wheel;

a carrier rotating around said first common axis, supporting said second common axis for connecting with said left drive shaft so as to transmit said driving force to said left wheel; and said final drive gear for rotating around a third common axis of rotation, said third common axis of rotation being offset from said first common axis of rotation, both said right drive shaft and said left drive shaft rotating around said first common axis of rotation.

2. The vehicular differential limiting apparatus according to claim 1, wherein said offset is parallel.

3. The vehicular differential limiting apparatus according to claim 1, wherein said second common axis of rotation is constituted by a pin.

4. The vehicular differential limiting apparatus according to claim 1, further comprising a differential case rotating around said first common axis;

wherein said final driven gear is fixedly connected to one end said differential case for joint rotation with said differential case; and wherein said first sun gear is connected to the differential case for joint rotation with said differential case.

5. The vehicular differential limiting apparatus according to claim 4, wherein said first sun gear and said first pinion have respective teeth with a helix angle of 0 degrees or more, and said second sun gear and said second pinion have respective teeth with another helix angle of 0 degrees or more.

6. The vehicular differential limiting apparatus according to claim 4, wherein said offset is perpendicular.

7. A vehicular differential limiting apparatus for distributing left wheel torque and right wheel torque, to a left wheel and a right wheel of a vehicle, respectively, via a left drive shaft and a right drive shaft, respectively, in proportion to a differential limiting torque in dependency on a speed difference therebetween, of an input torque from an engine of the vehicle via a torque converter and a transmission of the vehicle having a final drive gear for outputting the input torque to the differential limiting apparatus, the combination comprising:

a differential case having an outside periphery;

a final driven gear formed on said outside periphery of said differential case and meshed with said final drive gear for receiving said input torque;

a first sun gear connected to said differential case such that said first sun gear is coaxial with said left and right drive shafts and with said final driven gear;

a carrier rotating around said left and right drive shafts;

at least one pinion member rotatably supported on said carrier;

a first pinion formed on an end of said pinion member for meshing with said first sun gear;

a second pinion with a different number of teeth integrally formed at another end of said pinion member; and a second sun gear meshed with said second pinion, said second sun gear and said carrier for generating a differential torque to be transmitted between said left and right drive shafts, the differential limiting apparatus being in a compact configuration so as to effectively and smoothly distribute said input torque to each wheel even when running on a slippery road.

8. The vehicular differential limiting apparatus according to claim 7, wherein said final driven gear is situated at an end of said differential case, and said first sun gear is situated inside of and at another end of said differential case.

9. The vehicular differential limiting apparatus according to claim 8, wherein said left and right wheel shafts rotate around a first common axis of rotation, and said differential case rotates around said first common axis of rotation; and wherein said final driven gear is jointly rotatably connected to said differential case, and said first sun gear is jointly rotatably connected to said differential case.

10. The vehicular differential limiting apparatus according to claim 9, wherein said final drive gear rotates around a second common axis of rotation, and said first common axis of rotation is spaced apart in parallel from said second common axis of rotation.

11. A differential limiting apparatus mounted on a rear side of a vehicle and connected to an engine mounted on a front side of said vehicle for receiving torque from the engine via a propeller shaft and a drive pinion and for distributing left wheel torque and right wheel torque to a left rear wheel and a right rear wheel of the vehicle, respectively, via a left drive shaft and a right drive shaft, respectively, in proportion to a differential limiting torque in dependency on a speed difference therebetween, the combination comprising:

a differential case having an outer periphery;

a crown gear formed on said outer periphery of said differential case and meshed with said drive pinion for receiving said torque;

a first sun gear connected to said differential case such that said first sun gear is coaxial with said left and right drive shafts and is perpendicular with said drive pinion;

a carrier rotating around said left and right drive shafts;

at least one pinion member rotatably supported on said carrier;

a first pinion formed on an end of said pinion member for meshing with said first sun gear;

a second pinion with a different number of teeth integrally formed at another end of said pinion member; and a second sun gear meshed with said second pinion, said second sun gear and said carrier for generating a differential torque to be transmitted between said left and right drive shafts, the differential limiting apparatus being in a compact configuration so as to effectively and smoothly distribute said torque to each rear wheel even when running on a slippery road.

12. The vehicular differential limiting apparatus according to claim 11, wherein said first sun gear is situated inside of and at an end of said differential case opposite to said crown gear.

13. The vehicular differential limiting apparatus according to claim 12, wherein said left and right wheel shafts rotate around a first common axis of rotation, and said differential case rotates around said first common axis of rotation; and wherein said final driven gear is jointly rotatably connected to said differential case, and said first sun gear is jointly rotatably connected to said differential case.

14. The vehicular differential limiting apparatus according to claim 13, wherein said drive pinion rotates around a second common axis of rotation, and said first common axis of rotation extends perpendicular to said second common axis of rotation.

15. A differential apparatus for a vehicle comprising a center differential limiting apparatus mounted on a center portion of a four-wheel-drive vehicle having, an engine mounted on a front portion of said vehicle for generating a driving power and for providing said power to each wheel of the vehicle via left and right axles of the vehicle, a transmission directly connected to the engine, and a transmission drive shaft protruded from the transmission for transmitting the power to rear wheels and front wheels of the vehicle through a rear drive shaft and a front drive shaft of the vehicle, respectively, the combination comprising:

said center differential limiting apparatus comprising:

a first sun gear coaxially formed on an end of said transmission drive shaft;

a carrier rotating around said transmission drive shaft;

at least one pinion member rotatably supported on said carrier;

a first pinion formed on an end of said pinion member for meshing with said first sun gear;

a second pinion with a different number of teeth integrally formed at another end of said pinion member;

a second sun gear meshed with said second pinion and jointly rotatably connected to one end of said rear drive shaft for transmitting a driving force to said rear wheels;

a transfer drive gear formed on an end of said carrier for coaxially including said transmission drive shaft;

a transfer driven gear formed on an end of said front drive shaft and meshed with said transfer drive gear for transmitting a driving force to said front wheels;

wherein said center differential limiting apparatus generates a differential torque between said rear drive shaft and said front drive shaft;

a rear differential limiting apparatus comprising:

a rear drive pinion formed on a rear end of said rear drive shaft;

a rear differential case mounted on a rear portion of said vehicle between said rear left and right wheels;

a crown gear formed on an outside periphery of said rear differential case and meshed with said rear drive pinion;

a first rear sun gear connected to said rear differential case such that said first rear sun gear is coaxial with a rear left drive axle and a right drive axle and is perpendicular with said rear drive pinion;

a rear carrier rotating around said rear left and right drive axles and jointly rotatably connected with one of said rear drive axles;

at least one rear pinion member rotatably supported on said rear carrier;

a first rear pinion formed on an end of said rear pinion member for meshing with said first rear sun gear;

a second rear pinion with a different number of teeth integrally formed at another side of said rear pinion member;

a second rear sun gear coaxially connected to the other rear drive axle and meshed with said second rear pinion for generating a differential torque between said rear left and right drive axles;

a front differential limiting apparatus comprising:

a front drive pinion formed on a front end of said front drive shaft;

a front differential case mounted on a front portion of said vehicle between a front left wheel and a front right wheel;

a hypoid drive gear formed on an outside periphery of said front differential case and meshed with said front drive pinion;

a first front sun gear connected to said front differential case such that said first front sun gear is coaxial with a front left drive axle and a front right drive axle and is perpendicular with said front drive pinion;

a front carrier rotating around said front left and right drive axles and jointly rotatably connected with one of said front drive axles;

at least one front pinion member rotatably supported on said front carrier;

a first front pinion formed on an end of said front pinion member for meshing with said first front sun gear;

a second front pinion with a different number of teeth integrally formed at another end of said front pinion member; and a second front sun gear coaxially connected to the other front drive axle for joint rotation with said other front drive axle and meshed with said second front pinion, said differential apparatus for generating a differential torque between each wheels in a compact configuration so as to effectively and smoothly distribute said torque to each wheel even when running on a slippery road.

* * * * *